United States Patent [19]

Torii et al.

[11] Patent Number: 5,761,308
[45] Date of Patent: Jun. 2, 1998

[54] SYSTEM FOR REFUNDING PAYMENT FOR SOFTWARE

[75] Inventors: Naoya Torii; Haruhiko Tsunoda; Masao Fujiwara; Takayuki Hasebe. all of Kawasaki, Japan

[73] Assignee: Fujitsu Limited. Kawasaki, Japan

[21] Appl. No.: 662,123

[22] Filed: Jun. 12, 1996

[30] Foreign Application Priority Data

Sep. 1, 1995 [JP] Japan .................................. 7-225632

[51] Int. Cl.⁶ ..................... H04L 9/00; H04L 9/32
[52] U.S. Cl. ....................... 380/24; 380/2; 380/4; 380/9; 380/23; 380/25; 380/49; 380/50; 395/226; 395/235; 395/239; 395/244
[58] Field of Search ..................... 380/2, 4, 9, 23, 380/24, 25, 49, 50, 59; 395/226, 235, 239, 244

[56] References Cited

U.S. PATENT DOCUMENTS 4,658,093  4/1987  Hellman ............................. 380/25
5,103,392  4/1992  Mori .................................. 380/4
5,615,264  3/1997  Kazmierczak et al. ............ 380/4

Primary Examiner—Bernarr E. Gregory
Attorney, Agent, or Firm—Staas & Halsey

[57] ABSTRACT

There is provided a system for refunding payment for software applied to a software distribution system comprising at least one user terminal and a center. The center notifys the user terminal of the deciphering information on condition that a user of the user terminal pays for the software which is supplied to the user terminal in a eniphered form. Then, the user terminal decipheres the enciphered software by using the deciphering information. The refunding system comprises an installation monitoring unit 38a that records whether the software is installed legally and normally. When the user requests the center to refund the paymenet for the software, a refund request unit 38b of the user terminal notifies the center of the installation history along with the refund request. The center determines whether the installation history contains a data indicating that the installing operation of the software is accomplished normally. The payment for the software is refunded to the user only when an installation accomplishment information is not contained in the installation history.

11 Claims, 16 Drawing Sheets

SYSTEM FOR REFUNDING PAYMENT FOR SOFTWARE

BACKGROUND OF THE INVENTION

The present invention relates to a system for refunding payment for software applied to a system for distributing software such as computer programs and copyrighted video materials especially software in digital form.

Image and audio data as well as computer program have been distributed more and more with the advanced technologies of secondary storage of large capacities such as CD-ROMs and magneto-optics (MOs), high-speed communication using broadband integrated services digital network (BISDN), and community antenna televisions (CATVs). More specifically, copyrighted video materials conventionally provided on a video tape may be stored on a storage medium such as CD-ROM for distribution. There are some computer games using interactive properties of CD-ROMs. Communication lines also are using for supplying software such as copyrighted video materials or computer programs to users.

The digital data of the type described can be copied easily in a simple manner. In addition, the duplicated digital data does not deteriorated in quality in contrast to analog information. The digital data can thus be duplicated with the same quality. Such duplication of the digital data may give damages to manufacturers. More specifically, a user can duplicate the contents of CD-ROMs with some knowledge about computers if the user has an erasable magneto-optical disk or a magnetic disk device having large capacities.

In most cases, the manufacturers of the media prohibit to rent such digital data media on the grounds that it is impossible to provide enough security against possible fraud.

From the viewpoint of end users, however, such software is relatively expensive. The end users may think twice to buy software before they confirm that the software in question is available in his or her hard disk device or that it is the just one they want. With this respect, a recent software distribution system stores a large number of software of which functions are limited on a CD-ROM for distribution at a relatively low price. The end users pay for their desired software to obtain a code for eliminating the functional limitations. In such distribution system, the end user eliminates the functional limitations to the software by using the code obtained on the payment for it and installs the software into his or her hard disk device. It is, however, expected that a user who failed to eliminate the limitation may request for refunding the payment for the software. Even a user who completed the installation normally may request for refunding the payment for the software under the pretext that he or she failed to eliminate the limitation.

An object of the present invention is thus to provide a system for refunding payment for software that is capable of determining a fraud of a user to refund the payment only to those having a proper right of receiving the money in the software distribution system that stores a large number of software of which functions are limited on CD-ROMs for distribution at a relatively low price and the end users pay for their desired software to obtain a code for eliminating the functional limitations.

SUMMARY OF THE INVENTION

The above mentioned object is achieved by the present invention.

A first aspect of the present invention is a technique that can be used advantageously for a software distribution system which comprises user terminals and a center. The center notifies a user terminal of deciphering information on condition that a user of the user terminal pays for the software which is supplied to the user in a enciphered form. Then the user terminal deciphers the enciphered software by using the deciphering information in order to install the software into the user terminal.

The user terminal comprises software deciphering means, installation history recording means, and refund request means.

The software deciphering means deciphers a software desired by a user with a deciphering information which is supplied from the center. The installation history recording means records installation histories concerning installing operation of the software which has deciphered by the software deciphering means. The refund request means for supplying a refund request along with the installation history to the center. In this case, the center comprises refund processing means for determining whether the payment for the software should be refunded to the user by analyzing the installation history which is supplied along with the refund request from the user terminal.

The user terminal may comprise installation state monitoring means for monitoring the installation state of the software deciphered by the software deciphering means. In such a case, the installation history recording means records an installation start information which indicates that installing operation of the software is started when the installation state monitoring means detects start of the installing operation of the software. The installation history recording means may record an installation progress information when the installation state monitoring means detects that the software is under installing operation.

Furthermore, the installation history recording means may record an installation accomplishement information when the installation state monitoring means detects that installing operation of the software is accomplished normally.

The center may comprise buying history registration means and identity determination means. The buying history registration means registers a buying history including a software identification data for identifying the software and a deciphering information for using to decipher the software for each user identification data identifying the user. The identity determination means refers the buying history registration means according to the software identification data and the deciphering information in response to the reception of the refund request from the user terminal. And the identity determination means determines whether or not the user who requests to be refunded the payment for the software is the genuine buyer.

The installation history recording means may register an installation start information and an installation accomplishment information for the software for each software identification data.

The refund request means preferably enciphers the software identification data, the deciphering information, and the installation history to be transmitted to the center.

A second aspect of the present invention to achieve the above mentioned object is described below.

In the second aspect of the present invention, it is provided that software to be supplied to users contains a respective unique check code. In such a case, the user terminal comprises a deciphering means, a installation means, a properness confirmation means, and a refund request means. The deciphering means deciphers the software with a deciphering information supplied from the center. The installation means installs the software deciphered by the deciphering means. The properness confirmation means detects the check code added to the software which is installed by the installation means to determine properness of this check code. And, the refund request means notifys the center of a result of determination obtained by the properness confirmation means and a refund request made by the user. In such a case, the center comprises refund processing means determines whether the payment for the software should be refunded to the user by analyzing the result of determination notified from the user terminal.

The center may comprise buying history registration means and identity determination means. The buying history registration means registers a buying history including a software identification data and a deciphering information for each user identification data identifying the user. The identity determination means determines whether the requesting user is a genuine buyer of the software by refering the buying history registration means according to the software identification data and the deciphering information, when the center receives the refund request from the user terminal.

The check code may be a data indicative of attributes of software or any other identification data. For example, the check code may be a data indicative of a size of the software. Alternatively, the check code may be a certification code obtained when the software is compressed by using a hashing function. The software may consist of a number of software units and the check code may be a size data for individual software units or a certification code obtained when the software unit is compressed by using the hashing function.

Operations of the present invention are now described.

According to the first aspect of the present invention, a user terminal activates the deciphering means in response to reception of deciphering information after a user of the user terminal paid for the software. The deciphering means decipheres the enciphered software with the deciphering information supplied from the center. The user terminal then starts installing operation of the deciphered software. In this event, the installation history recording means starts to record the history of the installing operation of the software.

Then, if a user enters a command for requesting to be refunded payment for the software into the user terminal, the user terminal activates the refund request means in order to supply a refund request along with the installation history to the center.

Upon reception of the refund request from the user terminal, the center activates the refund processing means. The refund processing means analyzes the installation history supplied from the user terminal in order to determine whether the refund for the software should be permitted. In this event, the refund processing means permits no refund for the software if the installation history contains data indicating that installing operation of the software has been accomplished normally. On the contrary, the refund processing means permits to refund the payment for the software to the user if the installation history contains no data indicating that installing operation of the software has been accomplished normally. For example, if the installation history contains an installation start information and an installation accomplishment data, the refund processing means determines that the installing operation of the software has been accomplished normally. On other hands, If the installation history contains either the installation start information or the installation progress data and contains no installation accomplishment data, the refund processing means determines that the installing operation of the software is not accomplished normally.

In case that the center comprises the identity determination means and the buying history registration means, the refund request means in the user terminal notifys the center of a user identification data, a software identification data, a deciphering information, and the installation history, along with the refund request. Upon reception of those data and the refund request from the user terminal, the center activates the identity determination means. The identity determination means accesses the buying history registration means in accordance with the user identification data in order to read out the software identification data and the deciphering information from the buying history registration means. The identity determination means then compares the software identification data supplied from the user terminal with the software identification data read out from the buying history registration means, and compares the deciphering information supplied from the user terminal with the deciphering information read out from the buying history registration means, in order to determine whether they coincide with each other. If the software identification data and the deciphering information are coincident or matched with each other respectively, the identity determination means activates the refund processing means. The refund processing means analyzes the installation history supplied from the user terminal in order to determine whether the refund for the software should be permitted. If the installation history contains data indicating that installing operation of the software has been accomplished normally, the refund processing means permits no refund for the software. On the contrary, if the installation history contains no data indicating that installing operation of the software has been accomplished normally, the refund processing means permits to refund the payment for the software to the user.

According to the second aspect of the present invention, in response to reception of a deciphering information after a user of the user terminal paid for a software, the user terminal activates the deciphering means. The deciphering means decipheres the enciphered software with the deciphering information supplied from the center and supplys the deciphered software to the installation means. The installation means installs the decipheres software into the user terminal.

In this event, the properness confirmation means detects the check code from the installed software. The properness confirmation means then determines the properness of the check code in order to determine whether the installation is terminated normally. The properness confirmation means stores the result of the determination.

Then, if the user enters a command for requestin to be refunded payment for the software into the user terminal, the user terminal activates the refund request means. The refund request means notifys the center of the refund request along with the result of the determination obtained by the properness confirmation means.

Upon reception of the refund request and the result of the determination from the user terminal, the center activates the refund processing means. The refund processing means determines whether the check code is proper by refering the result of the determination. If the check code is proper, the refund processing means permits refunding payment for the software to the user.

In case that the center comprises the identity determination means and the buying history registration means, the refund request means in the user terminal notifys the center of a user identification data, a software identification data, a deciphering information, and the result of determination for the properness of the check code, along with the refund request. Upon reception of the those data and the refund request from the user terminal, the center activates the identity determination means. The identity determination means accesses the buying history registration means in accordance with the user identification data in order to read out the software identification data and the deciphering information from buying history registration means. The identity determination means then compares the software identification data supplied from the user terminal with the software identification data read out from the buying history registration means, and compares the deciphering information supplied from the user terminal with the deciphering information read out from the buying history registration means. If the software identification data and the deciphering information are coincident or matched with each other, respectively, the identity determination means activates the refund processing means. The refund processing means determines whether the check code is proper by refering the result of the determination. If the result of the determination indicates that the check code is proper, the refund processing means permits refunding payment for the software to the user.

DETAILED DESCRIPTION OF THE PREFERRED EMBODIMENT

Figure 1:
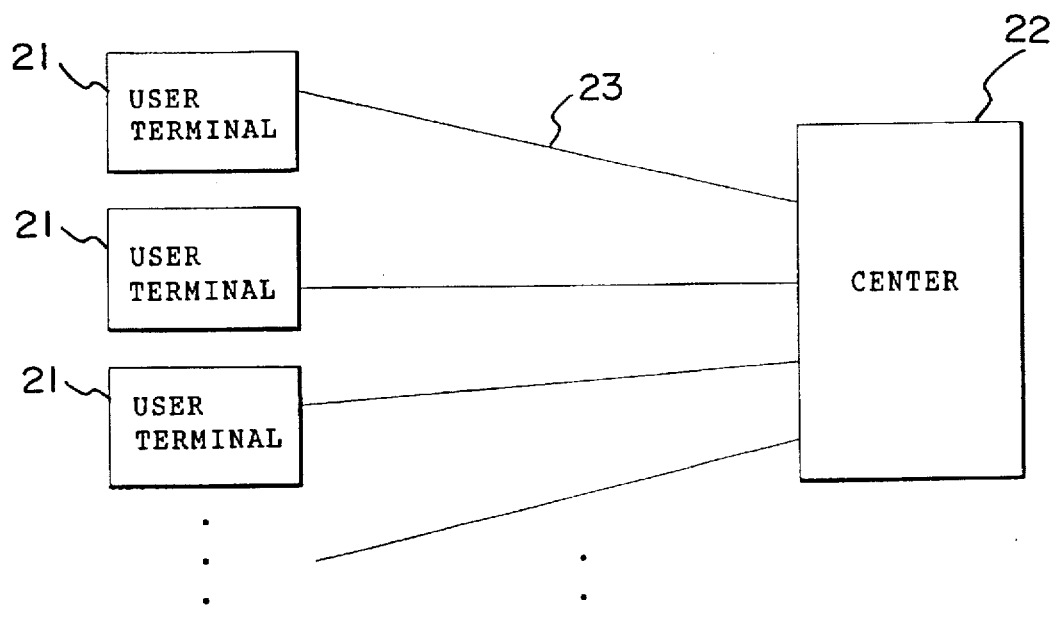
FIG. 1 is a block diagram schematically showing a structure of a software distribution system to which a first embodiment of the present invention is applied.

Embodiments of the present invention are described below with reference to the drawing.

FIG. 1 is a block diagram schematically showing a structure of a software distribution system to which a system for refunding money paid for software according to the present invention is implemented.

This software distribution system provides users with a enciphered contents stored on a CD-ROM or any other recording media. The contents may be down-loaded through the line directly to the user. For the purpose of simplification, the contentss provided to the users in this way are hereinafter referred in general to as software. The user can obtain a deciphering key for the software when he or she pays for the software. More specifically, the software distribution system described herein comprises a number of user terminals 21 connected to a common center 22 through digital communication lines 23. The user can communicate with the center through the line to pay for the software or to receive the deciphering code. As to the payment, the users may notify the center of the number of his or her credit card or a banking account number on the one hand for direct charge to a user's banking account, or may transfer the payment in advance by bank remittance on the other hand.

In this embodiment, it is assumed that the contentss have their own check code. This check code is obtained by means of enciphering a specific coding data (described in detail below) with a deciphering key assigned to the contentss. The coding data can be used commonly by each contents and is stored on a read-only memory provided in the user terminal 21 (see FIG. 3). When the stored contents and the check code are deciphered with a proper deciphering key, the deciphered check code should be the same as the coding data stored on the ROM 25.

Figure 2:
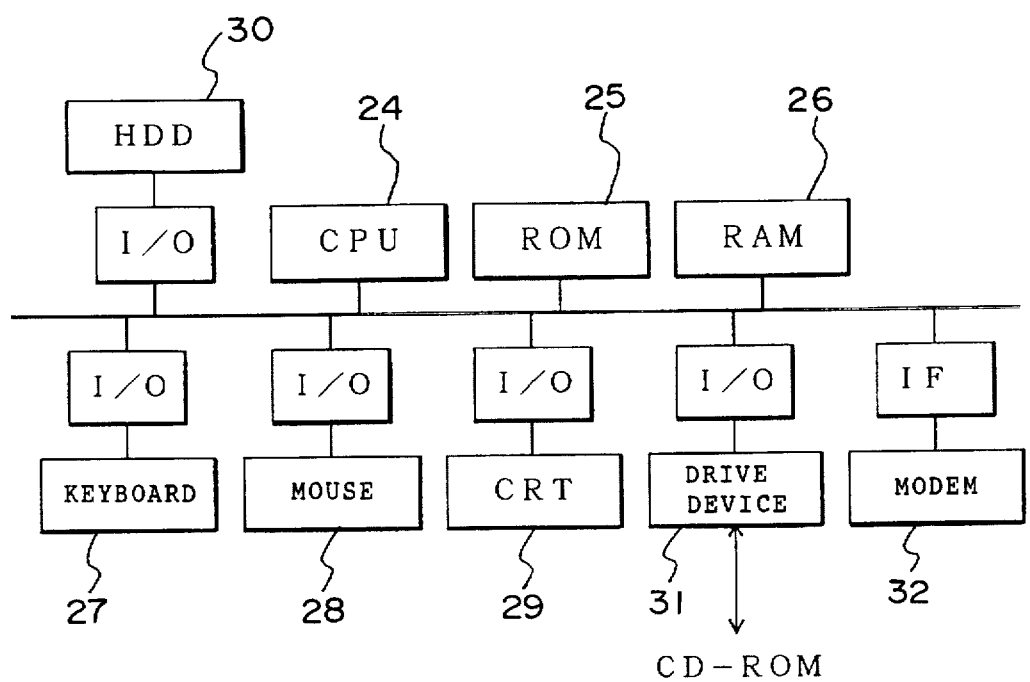
FIG. 2 is a block diagram showing a structure of a user terminal.

FIG. 2 is a block diagram showing an exemplified construction of the user terminal 21 according to the present invention. The user terminal 21 comprises a central processing unit (CPU) 24, a read-only memory (ROM) 25, and a random access memory (RAM) 26. The CPU 24, the ROM 25, and the RAM 26 are connected with each other through a bus. The user terminal 21 also comprises a keyboard 27, a mouse 28, a cathode-ray tube (CRT) 29, a hard disk device (HDD) 30, and a drive device 31 all of which are connected to the bus through respective input and output (I/O) devices. The bus is connected to a modem 32 through an interface (IF). The modem is connected to the communication line 23 for the communication with the center 22.

The CPU 24 carries out the program(s) stored on the ROM 25 or the RAM 26 for the communication between the user terminal 21 and the center 22, the deciphering of the ciphered contents, and the installation of the deciphered contents.

The keyboard 27 and the mouse 28 are input devices with which the user enters a command or a data. The CRT 29 displays an image data. The hard disk device (HDD) 30 is a storage device into which the deciphered contents is installed. In addition, the hard disk device (HDD) 30 stores an installation history file 26a that serves as installation history recording means of the present invention. The drive device 31 is for reading the contents out of, for example, the CD-ROM. The modem 32 converts the data processed on the user terminal 21 into a data in digital format for the transmission through the communication line 23 to the center 22 in this embodiment. When receiving digital data transmitted from the center 22 through the communication line 23, the modem 32 converts it in analog format for the subsequent processing on the user terminal 21.

Figure 3:
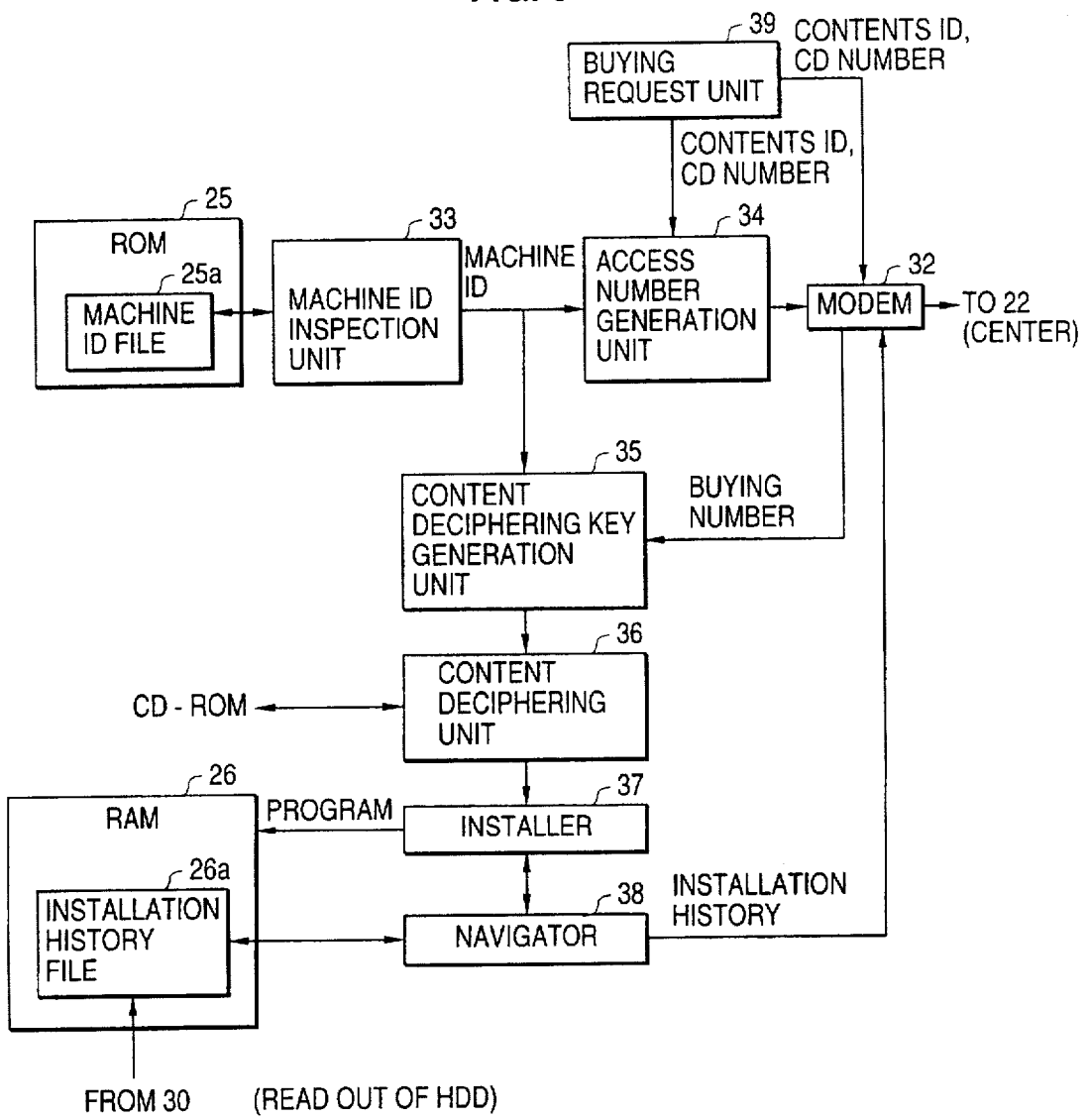
FIG. 3 is a functional block diagram of the user terminal according to the first embodiment of the present invention.

Now, description is made on functions of the user terminal 21 achieved as a result that CPU 24 carries out the program (s) stored on the ROM 25 or the RAM 26. As shown in FIG. 3, the user terminal 21 comprises a machine ID inspection unit 33, an access number generation unit 34, a content deciphering key generation unit 35, a content deciphering unit, an installer 37, a navigator 38, and a buying request unit 39.

The machine ID inspection unit 33 reads machine IDs out of the machine ID file 25a in the ROM 25. The machine ID is for use in identifying the user terminal 21. The access number generation unit 34 generates an access number to be notified to the center 22 for the request for buying a contents. More particularly, the access number generation unit 34 substitutes an arithmetic equation previously determined between the unit 34 and the center 22 for the machine ID and a CD number for identifying the CD-ROM on which the contents is recorded to provide the access number. The access number generation unit 34 then notifies the center 22 of the calculation result as the access number.

The content deciphering key generation unit 35 generates a deciphering key by using a buying number supplied from the center 22 on the payment base. The buying number is notified to the user by the center 22 in cash on delivery. More specifically, the buying number is a data obtained by means of ciphering the deciphering key with the machine ID. The content deciphering key generation unit 35 thus decipheres the buying number entered by the user with the machine ID to generate the deciphering key. The content deciphering unit 36 decipheres the contents using the deciphering key generated by the content deciphering key generation unit 35. The installer 37 installs the contents deciphered by the content deciphering unit 36 into the user terminal 21 as described more in detail below. The navigator 38 is for use in maintenance of the installer as described more in detail below.

In this embodiment the installation history file 26a stored on the hard disk device (HDD) 30 is written from the hard disk device (HDD) 30 to the RAM 26 when the contents is installed into the user terminal 21. The installation history file 26a registers installation histories of the contents for each contents ID for use in identifying the software. The installation history file 26a is preferably protected from free-update by a user. For example, the installation history file may be enciphered and stored or may be stored on a special RAM or hard disk device, which are the out of the scope of the present invention.

Figure 4:
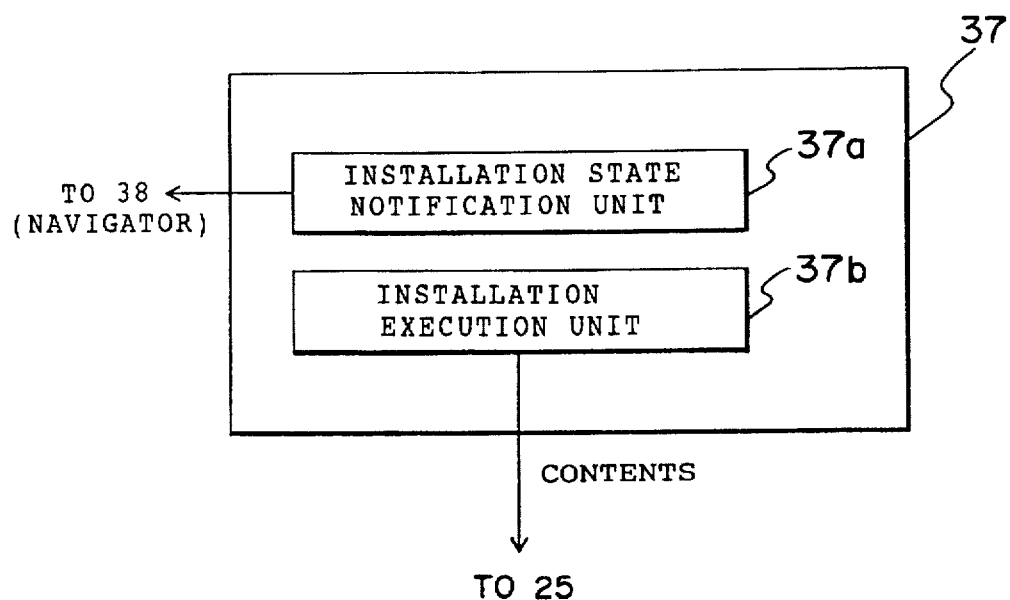
FIG. 4 is a functional block diagram of an installer.

The installer 37 and the navigator 38 are described in detail with reference to FIGS. 4 and 5. FIG. 4 is a functional block diagram of the installer 37. As shown in the figure, the installer 37 comprises an installation state notification unit 37a and an installation execution unit 37b. The installation state notification unit 37a notifies the navigator 38 of a start code indicative of the beginning of the installation when the installation is initiated. In addition, the installation state notification unit 37a notifies the navigator 38 of a termination code indicative of normal termination of the installation operation when the installation operation is terminated normally. The installation execution unit 37b executes the installation of the contents.

Figure 5:
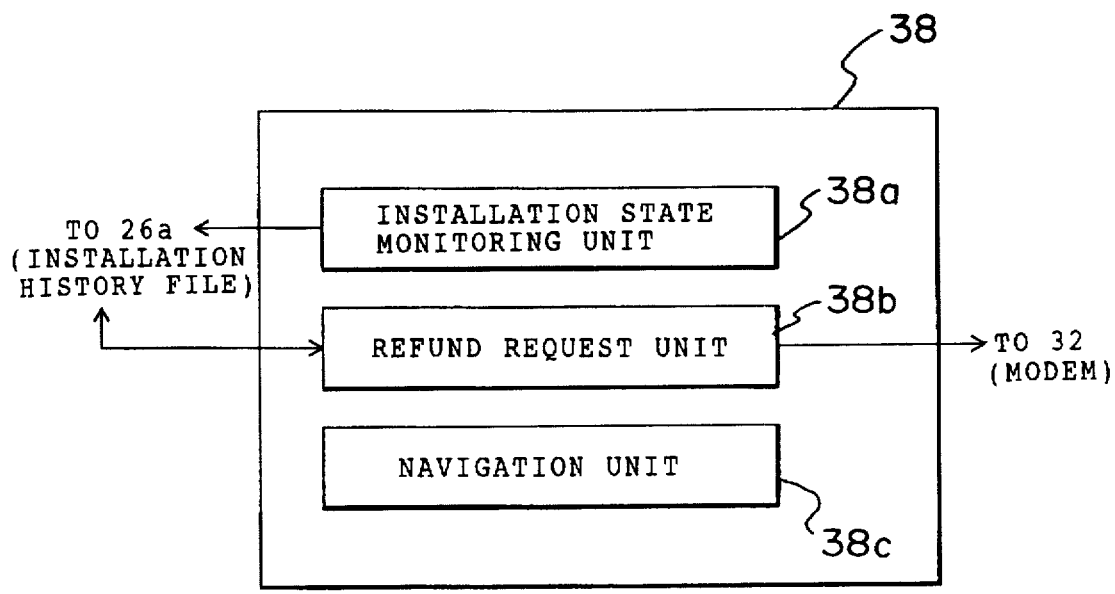
FIG. 5 is a functional block diagram of a navigator.

FIG. 5 is a functional block diagram of the navigator 38. As shown in the figure, the navigator 38 comprises an installation state monitoring unit 38a, a refund request unit 38b, and a navigation unit 38c. The installation state monitoring unit 38a monitors a state of installation carried out by the installer 37. The installation state monitoring unit 38a writes the installation history (start code and termination code) supplied from the installation state notification unit 37a in the installer 37 into the installation history file 26a in the RAM 26 along with the contents ID.

The refund request unit 38b searches for the installation history file 26a by using the contents ID as a keyword when the refund request command and the contents ID are entered through the keyboard 27 or the mouse 28. The refund request unit 38b then reads the installation history corresponding to the contents ID out of the installation history file 26a. The read installation history is supplied to the center 22 along with the refund request.

The navigation unit 38c realizes conventional navigator functions.

Next, the center 22 in the present embodiment is described. Referring to FIG. 5, the center 22 comprises, a central processing unit (CPU) 40, a read-only memory (ROM) 41, and a random access memory (RAM) 42. The CPU 40, the ROM 41, and the RAM 42 are connected with each other through a bus. The bus is also connected to a keyboard 43, a mouse 44, a cathode-ray tube (CRT) 45, and a hard disk device (HDD) 46 through respective input and output (I/O) devices. A modem 47 is connected to the bus through an interface (IF).

The CPU 40 carries out the program stored on the ROM 41 or the RAM 42 to communicate with the user terminals 21, to conduct accounting, to generate the buying number, or to refund the money already paid for the software. The keyboard 43 and the mouse 44 are for an operator at the center 22 to enter any data and commands. The CRT 45 displays image data on a screen. The hard disk device (HDD) 46 stores a key file 46a, a buying history file 46b, and a fraud user file 46c, which are described more in detail below.

The modem 47 is connected to the communication line 23 to send and receive information to and from the user terminals 21.

Figure 6:
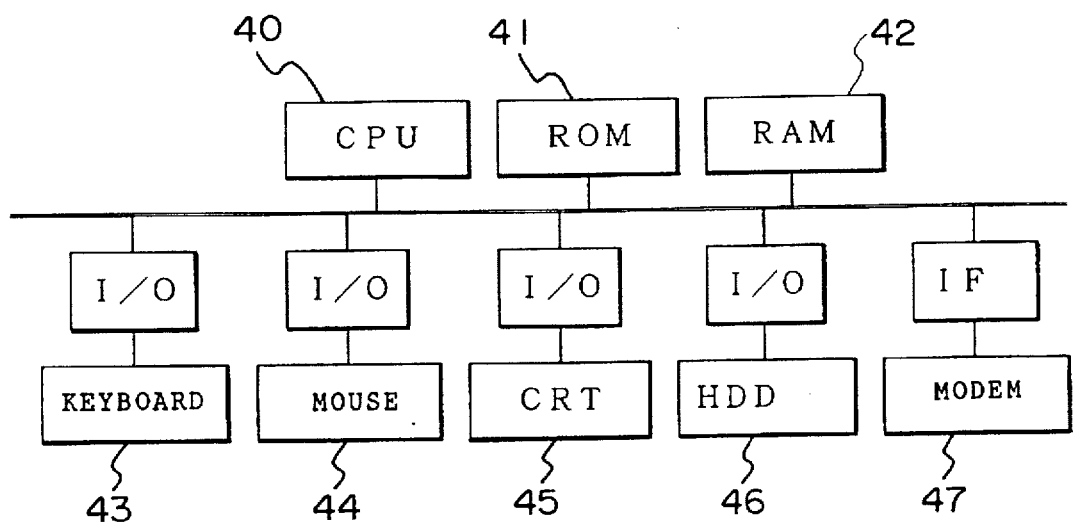
FIG. 6 is a block diagram showing a structure of a center according to the first embodiment of the present invention.
Figure 7:
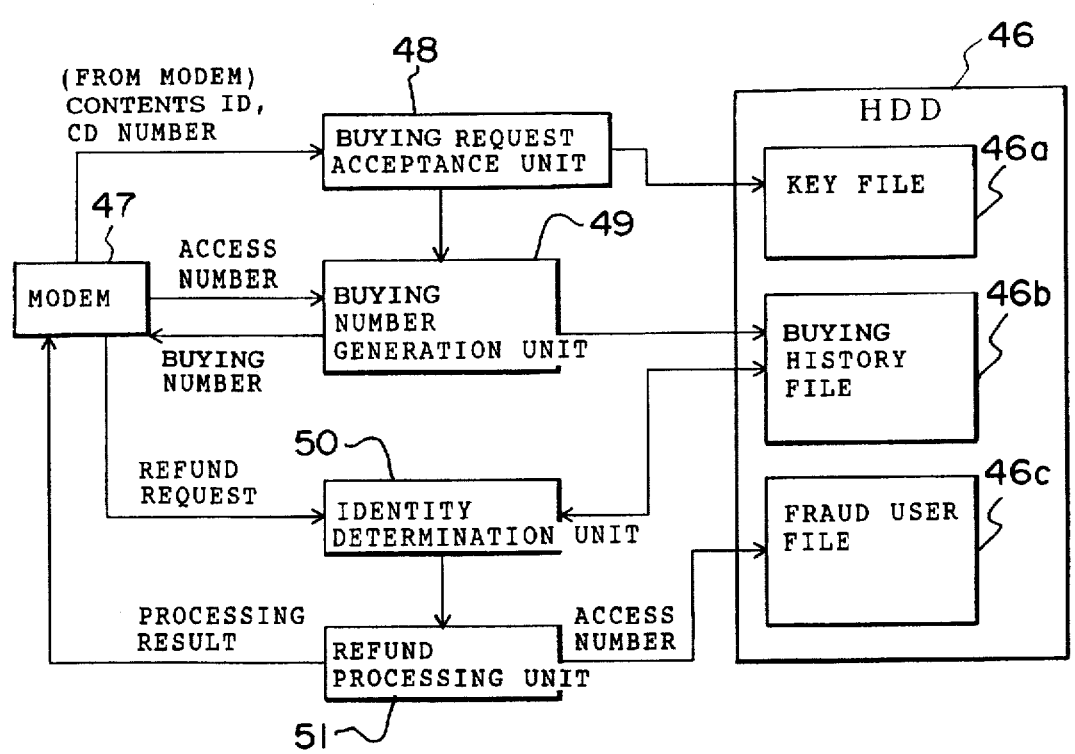
FIG. 7 is a functional block diagram of the center according to the first embodiment of the present invention.

Referring to FIG. 6, described are functions of the center 22 realized when the CPU 40 carries out the program on the ROM 41 and RAM 22. As shown in the figure, the center 22 comprises a buying request acceptance unit 48, a buying number generation unit 49, an identity determination unit 50, and a refund processing unit 51. As mentioned above, the hard disk device (HDD) 46 stores the key file 46a, the buying history file 46b, and the fraud user file 46c. The key file 46a registers the deciphering keys for the contents for each contents ID to identify the software. The buying history file 46b registers buying histories of users. More specifically, the buying history file 46b registers the contents ID that a user bought, and the buying number informed to the user for the contents for each access number serving as user identification data. The fraud user file 46c registers the access number of a user who requested to refund the money improperly.

In response to the reception from the user terminal 1 of the buying request along with the contents ID of the contents to be sold, and the CD number of the CD-ROM on which the target contents is stored, the buying request acceptance unit 48 reads the deciphering key corresponding to the contents ID out of the key file 46a in the hard disk device (HDD) 46.

The buying request acceptance unit 48 then informs the buying number generation unit 49 of the CD number and the deciphering key.

Figure 8:
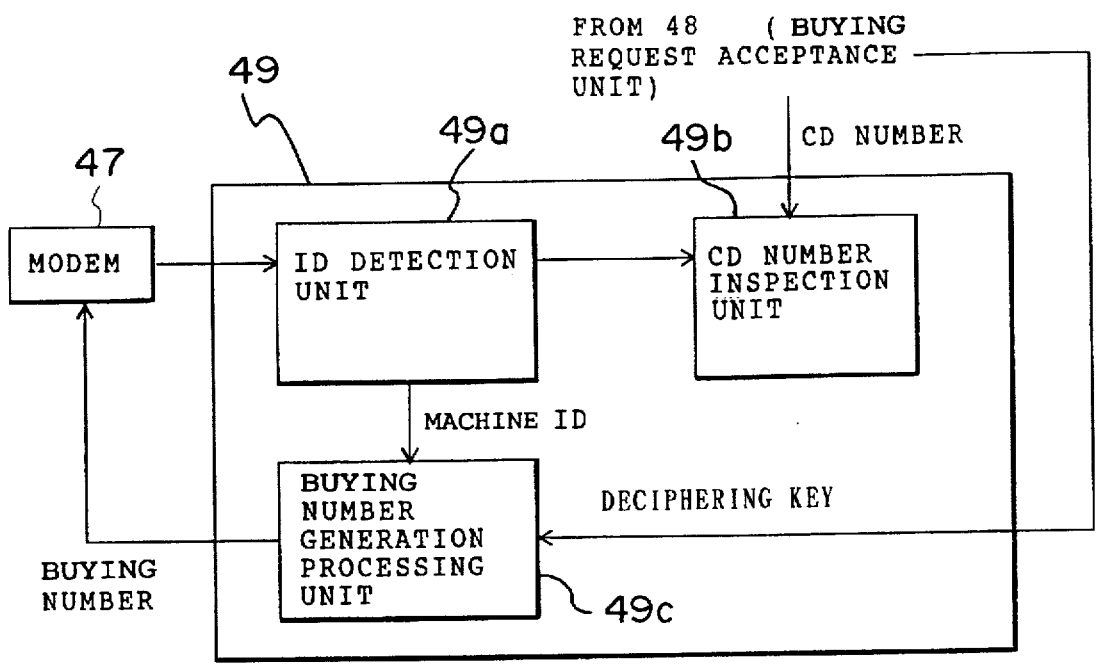
FIG. 8 is a functional block diagram of a buying number generation unit.

In response to the reception of the access number from the user terminal 21 and the CD number as well as the deciphering key from the buying request acceptance unit 48, the buying number generation unit 49 generates a buying number by using these data. More specifically, the buying number generation unit 49 comprises, as shown in FIG. 8, an ID detection unit 49a, a CD number inspection unit 49b, and a buying number generation processing unit 49c. The ID detection unit 49a substitutes an arithmetic equation previously determined between the buying request acceptance unit 48 and the user terminal 21 for this access number to calculate the machine ID and the CD number. The arithmetic equation used at that time is the backward-arithmetic equation of the arithmetic equation used by the access number generation unit. The ID detection unit 49a then notifies the CD number inspection unit 49b and the buying number generation processing unit 49c of the calculated CD number and the machine ID, respectively. The CD number inspection unit 49b compares the CD number supplied from the buying request acceptance unit 48 with the CD number calculated by the ID detection unit 49a to determine whether these two numbers are the same. If the numbers do not coincide with each other the CD number inspection unit 49b interrupts the processing and notifies the user terminal 21 of it. If these numbers coincide with each other, the CD number inspection unit 49b activates the buying number generation processing unit 49c. The buying number generation processing unit 49c encipheres the deciphering key received from the buying request acceptance unit 48 by using the machine ID calculated by the ID detection unit 49a and supplies the enciphered machine ID as a buying number to the user terminal 21.

Turning back to FIG. 6, the identity determination unit 50 determines, when it receives the refund request from the user terminal 21, whether the requesting user is the one who bought the software. More specifically, the identity determination unit 50 searches for the buying history file 46b in the hard disk device (HDD) 46 in response to the reception from the user terminal 21 of the refund request along with the access number, the contents ID, and the buying number. The identity determination unit 50 then reads the contents ID and the buying number corresponding to the access number. The identity determination unit 50 compares the contents ID received from the user terminal 21 with the contents ID in the buying history file 46c. If these contents IDs coincide with each other, the identity determination unit 50 compares the buying number received from the user terminal 21 with the buying number in the buying history file 46b. If these buying numbers coincide with each other, the identity determination unit 50 determines that the refund requesting user is a proper one. On the other hand, if at least one of the contents ID and the buying number is/are not coincident, the identity determination unit 50 determines that the requesting user is a fraud user who dishonestly request to refund the money and registers the access number of that user in the fraud user file 46c in the hard disk device (HDD) 46.

The refund processing unit 51 refers the installation history received from the user terminal only when the refund requesting user is a genuine user who actually bought the software. The refund processing unit 51 then determines whether the start code alone is recorded in the installation history or both the start and termination codes are recorded therein. If only the start code is recorded in the installation history, the refund processing unit 51 determines that the installation is terminated abnormally and carries out operation to refund the money for the software. The refund processing unit 51 notifies the user of the processing result. On the contrary, if both the start and termination codes are recorded in the installation file, the refund processing unit 51 determines that the requesting user is a dishonest one who requests to refund the money in spite that the installation is terminated normally. The refund processing unit 51 registers the access number of the requesting user in the fraud user file 46c.

Figure 9:
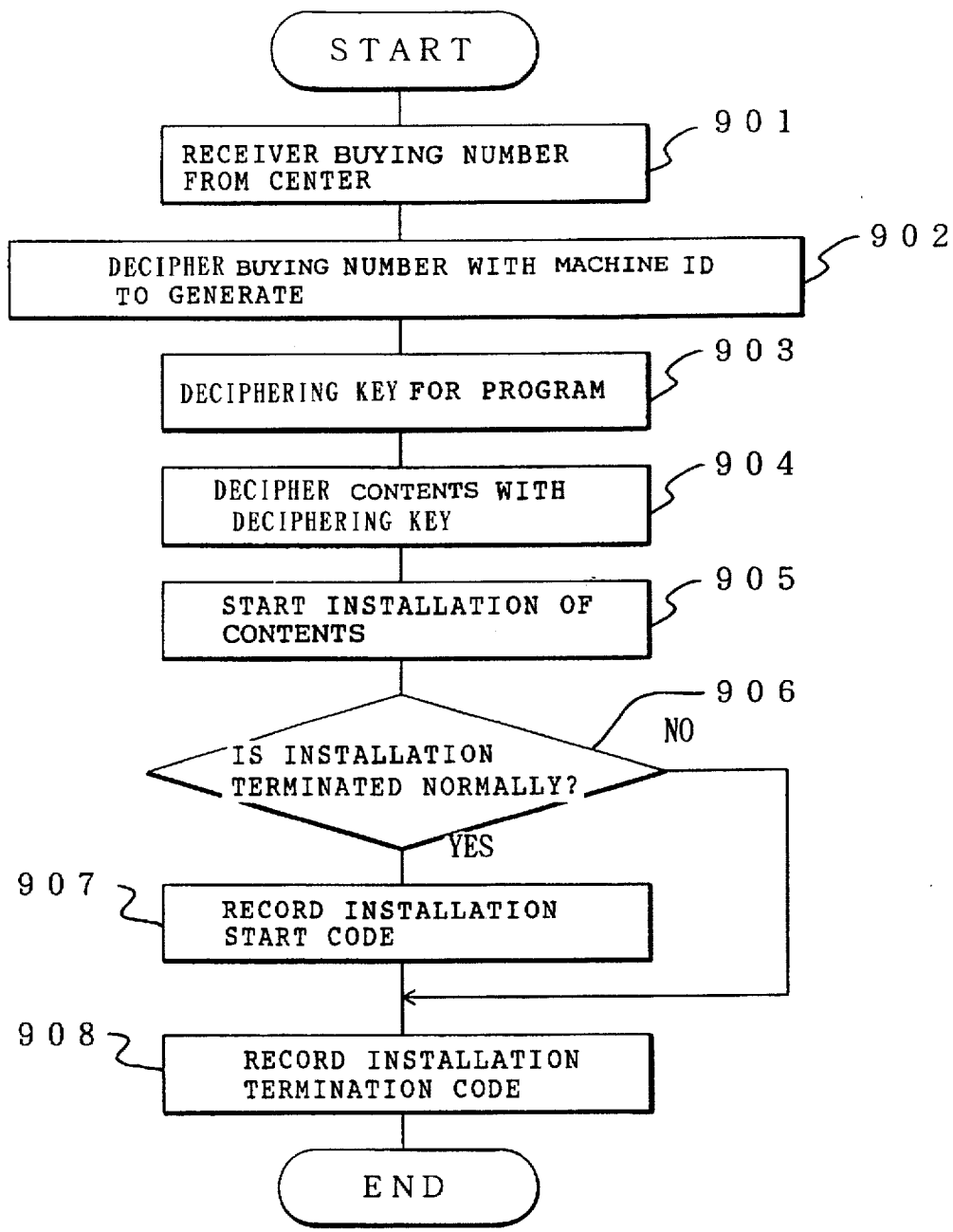
FIG. 9 is a flow chart illustrating operation carried out by the user terminal in response to the reception of a buying number.

Operations and effects of the present invention are described below. FIG. 9 shows a flow chart for use in describing operation carried out by the user terminal 21 when it issues the buying request. When the user terminal receives the buying number through the modem 32 (step 901), the user terminal 21 activates the content deciphering key generation unit 35. In response to the reception of the buying number, the content deciphering key generation unit 35 reads the machine ID of the user terminal where it locates, out of the machine ID file 25a in the ROM 25 (step 902). The content deciphering key generation unit 35 then notifies the content deciphering unit 36 of the generated deciphering key.

The content deciphering unit 36 reads the contentss on the CD-ROM through the driver device 31 to decipher the read contents with the deciphering key (step 903). The deciphered contents is installed into the hard disk device (HDD) 30 in the user terminal 21 by means of the installer 37 (step 904). In this event, before initiation of the installation, the installation state notification unit 37a in the installer 37 notifies the navigator 38 of the installation start code. The installation state monitoring unit 38a in the navigator 38 records the received start code into the installation history file 26a (step 905).

When the installation execution unit 37b terminates the installation of the contents normally (step 906), the installation state notification unit 37a records the installation termination code into the installation history file 26a (step 907). The installation state notification unit 37a then displays on a screen of the CRT 29 whether the installation is finished normally (step 908).

On the other hand, if the installation is terminated abnormally at the above mentioned step 906, the installation state notification unit 37a does not notify the navigator of the installation termination code. The installation monitoring unit 38a thus records nothing in the installation history file 26a.

In this way, the start and termination codes are recorded on the installation history file 26a when the installation is terminated normally, while only the start code is recorded thereon when the installation is terminated abnormally.

Figure 10:
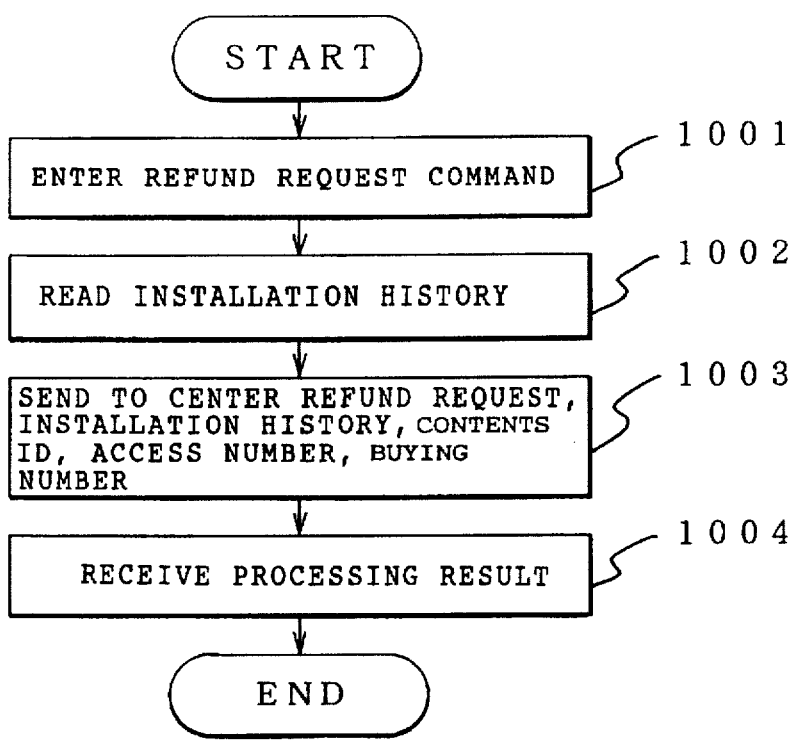
FIG. 10 is a flow chart illustrating operation carried out by the user terminal to issue a refund request.

FIG. 10 is a flow chart illustrating operation carried out by the user terminal 21 when the user enters a refund request command.

When the user enters the refund request command and the contents ID through the keyboard 27 or the mouse 28 (step 1001), the refund request unit 38b in the navigator 38 is activated. The refund request unit 38b reads the installation history corresponding to the contents ID out of the installation history file 26a (step 1002) to supply the refund request for the software, the installation history, the contents ID, the access number, and the buying number to the center 22 through the modem 32 (step 1003).

In response to this, the center 22 carries out or not the refund processing depending on the result of user identification check and the analysis on the installation history. The center 22 indicates whether the refund is carried out to the user terminal 21. In response to the reception of the processing result (step 1004), the user terminal displays it on the screen of the CRT 29.

Figure 11:
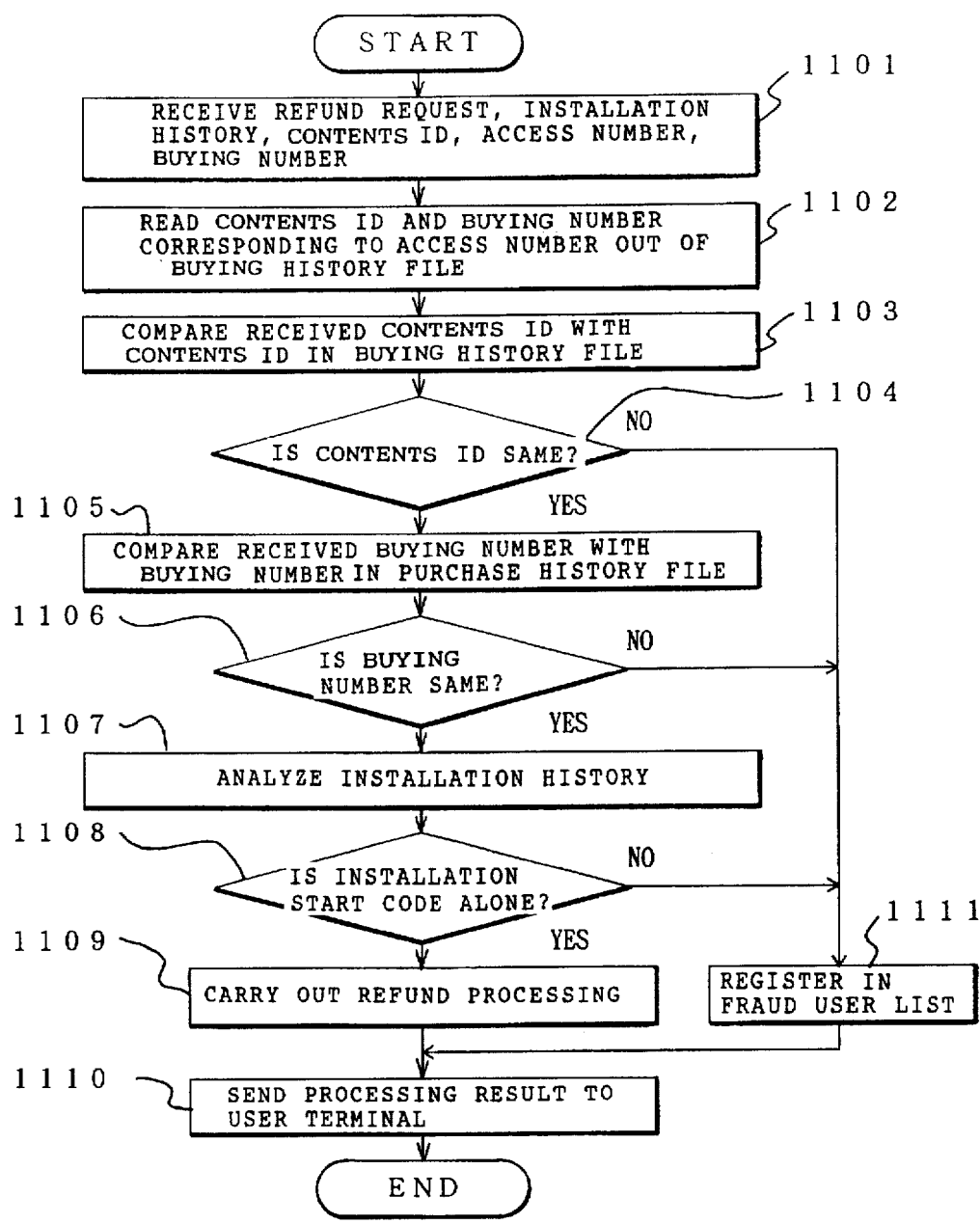
FIG. 11 is a flow chart illustrating operation carried out by the center in response to the refund request supplied from the user terminal.

Referring to FIG. 11, described is the operation of the center upon reception of the refund request. The center 22 activates the identity determination unit 50 when the modem 47 receives (step 1101) the installation history, the contents ID, the access number, and the buying number along with the refund request supplied from the user terminal 21. The identity determination unit 50 searches for the buying history file 46a in the hard disk device (HDD) 46 and reads the contents ID and the buying number corresponding to the access number (step 1102). The identity determination unit 50 then compares the contents ID received from the user terminal 21 with the contents ID read out of the buying history file 46b (step 1103). If these IDs coincide with each other (step 1104), the identity determination unit 50 compares the buying number received from the user terminal 21 with the buying number read out of the buying history file 46b (step 1105). If these buying numbers coincide with each other (step 1106), the identity determination unit 50 determines that the requesting user is a genuine user who actually bought the software. The identity determination unit 50 thus activates the refund processing unit 51.

The refund processing unit 51 analyses the installation history (step 1107) to determine whether the installation history received from the user terminal contains only the installation start code or contains both the installation start and termination codes (step 1108). If only the start code is recorded the refund processing unit 51 determines that the installation is terminated abnormally. Accordingly, the refund processing unit 51 carries out the refund processing (step 1109).

If the contents IDs are different from each other at the step 1104, or if the buying numbers are different from each other at the step 1106, the identity determination unit 50 determines that the requesting user dishonestly requests the refund. The identity determination unit 50 thus registers the access number for the user in the fraud user list 46c in the hard disk device (HDD) 46 (step 1111).

If both the start and termination codes are in the installation history at the step 1108, the identity determination unit 50 determines that the user requests the refund dishonestly under the pretext that the installation is terminated abnormally in spite that the installation is, in fact, terminated normally. The identity determination unit 50 thus registers the access number for the user in the fraud user list 46c in the hard disk device (HDD) 46 (step 1111).

As mentioned above, according to the present invention, the money for the software is refunded only to the genuine buyer when the installation is terminated abnormally. It is noted that the installation history may be enciphered for the transmission to the center. The refund request may be made automatically when the termination code is not recorded in the installation history.

Furthermore, in the present embodiment, the start and termination codes are used for the determination of the installation state. An installation progress code may be, however, used along with the start and termination codes. In such a case, the center analyses the progress of the installation when the installation is terminated abnormally at the user terminal 21 to determine a cause of the failure. This cause may be informed to the user.

<Second Embodiment>

A second embodiment of the present invention is described with reference to the drawing. This embodiment is applied to a software distribution system similar to the one described in conjunction with the first embodiment. The user terminals 21 and the center 22 are thus similar in structure to those described above. Accordingly, description thereof will be omitted.

In this second embodiment, each contents has a header including a data indicative of the size of the entire contents. The contents and the header are enciphered together and stored on CD-ROMs. In addition, the contents is divided into a number of blocks. Each block has a block size data indicative of the size of the block at the end thereof. This block size data is used as a check data in this embodiment.

Figure 12:
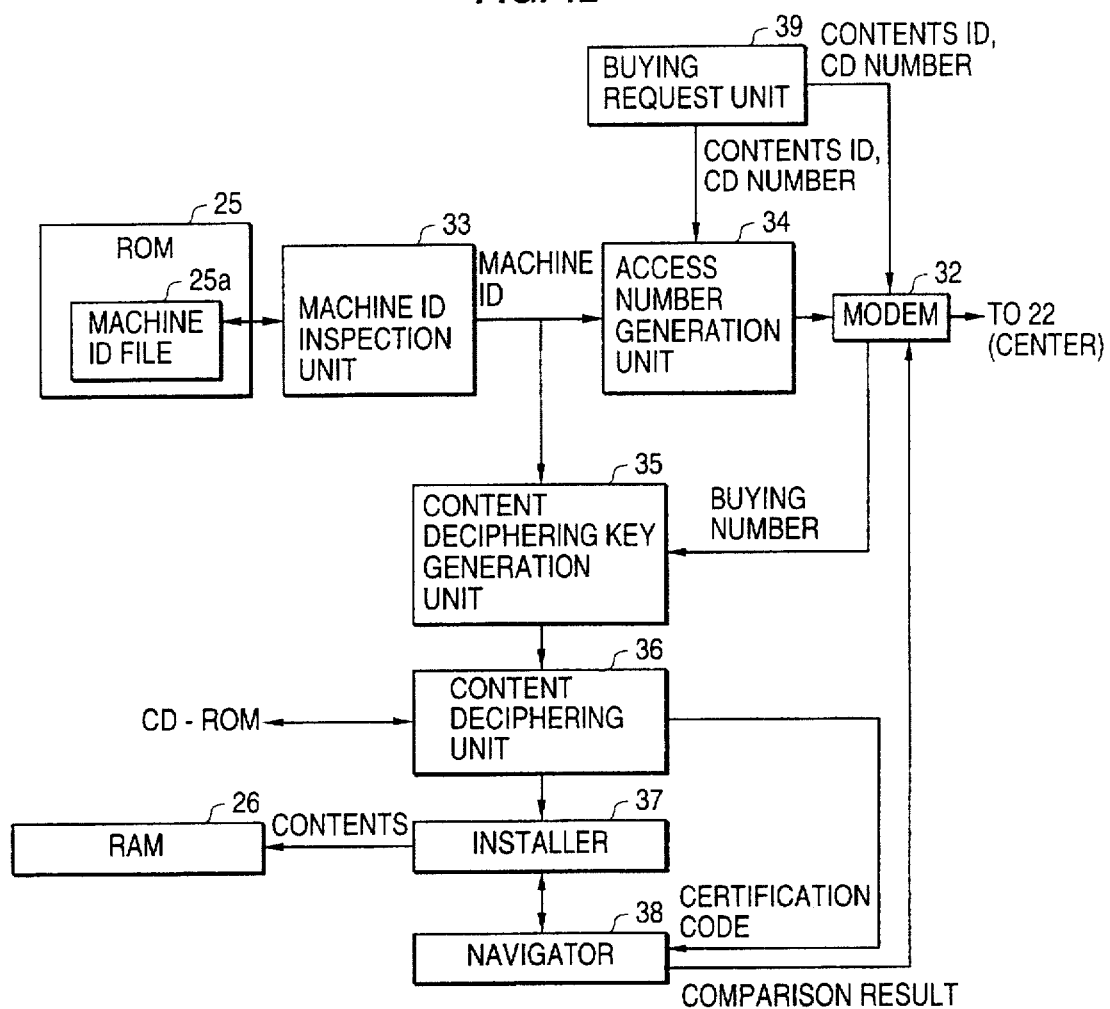
FIG. 12 is a functional block diagram of a user terminal according to a second embodiment of the present invention.

FIG. 12 is a functional block diagram of the user terminal 21 according to the second embodiment of the present invention. As shown in the figure, the user terminal 21 comprises the machine ID inspection unit 33, the access number generation unit 34, the content deciphering key generation unit 35, the content deciphering unit 36, the installer 37, the navigator 38, and the buying request unit 39. The machine ID inspection unit 33, the access number generation unit 34, the content deciphering key generation unit 35, the content deciphering unit 36, and the buying request unit 39 are similar to those described in conjunction with the first embodiment. Description of such components is thus omitted.

The installer 37 is the one used conventionally to install contentss into a hard disk device.

Figure 13:
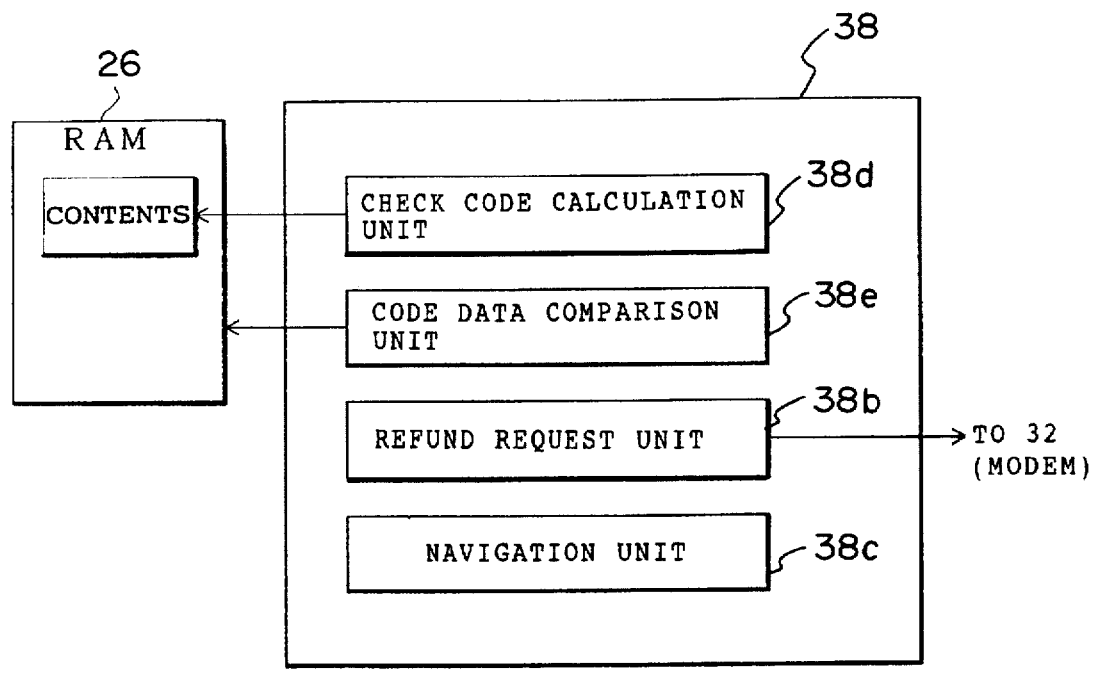
FIG. 13 is a functional block diagram of a navigator according to the second embodiment of the present invention.

The navigator 38 comprises, as shown in FIG. 13, a check code calculation unit 38d, a code data comparison unit 38e, the refund request unit 38b, and the navigation unit 38c. The check code calculation unit 38d and the code data comparison unit 38e are components to realize properness confirmation means of the present invention. The check code calculation unit 38d detects check data (data indicative of block size) for each block of the contents after the installation. The check code calculation unit 38d then calculates the sum of these data to obtain the data indicative of the size of the entire contents. The code data comparison unit 38e compares the size data obtained by the check code calculation unit 38d with the size data detected at the header of the deciphered contents before installation thereof. The code data comparison unit 38e then records the comparison result on the RAM 26.

The refund request unit 38b reads the comparison result out of the RAM 26 when the user enters a refund request command to send the comparison result along with the refund request to the center 22 through the modem 32.

The navigation unit 38c is similar to the navigation unit 38c described above in conjunction with the first embodiment of the present invention.

Figure 14:
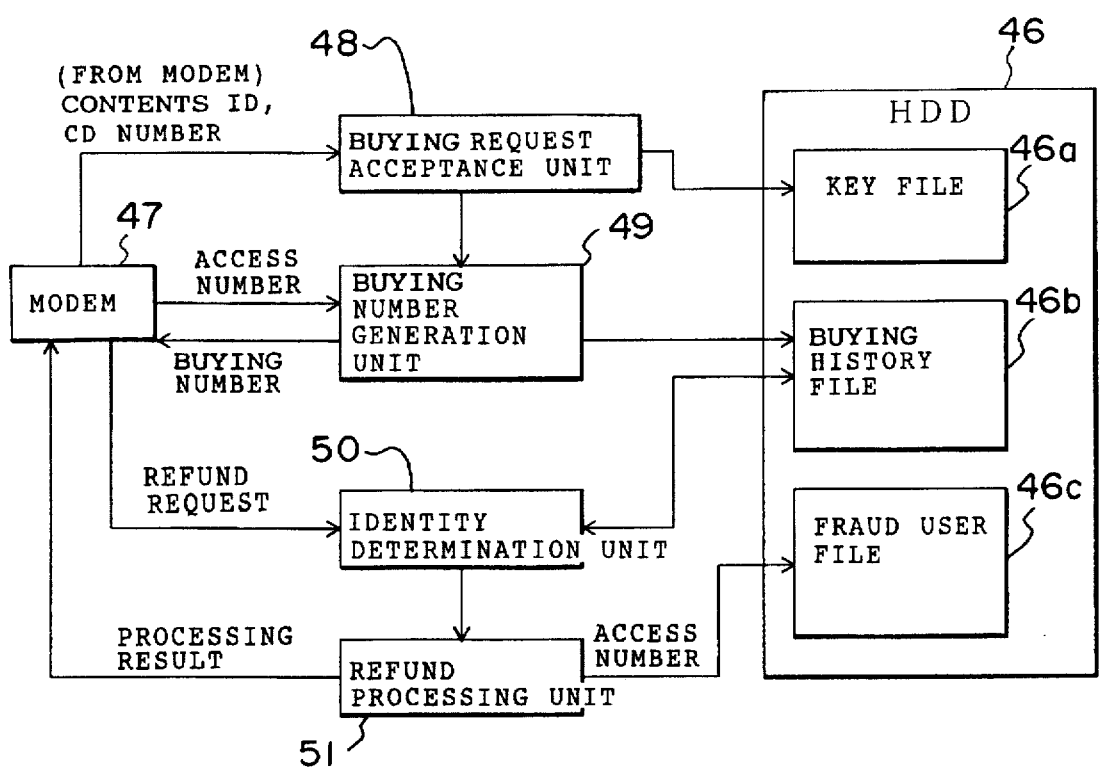
FIG. 14 is another functional block diagram of the center according to the second embodiment of the present invention.
Figure 15:
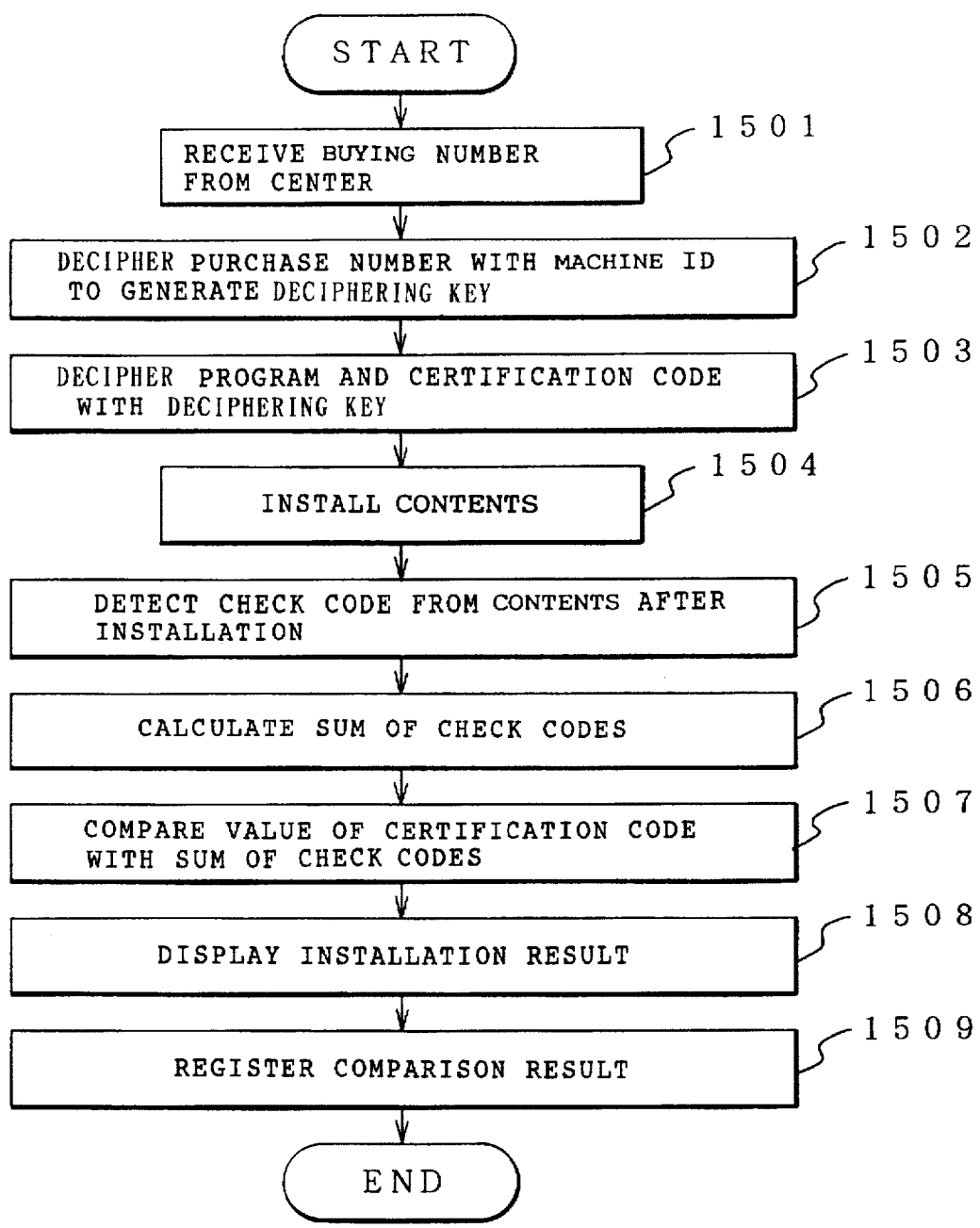
FIG. 15 is a flow chart illustrating operation carried out by the user terminal in response to the reception of a buying number.

FIG. 14 is a functional block diagram of the center 22 according to the second embodiment. As apparent from the figure, the center 22 comprises the buying request acceptance unit 48, the buying number generation unit 49, the identity determination unit 50, and the refund processing unit 51. The hard disk device (HDD) 46 contains the key file 46a, the buying history file 46b, the fraud user file 46c.

The refund processing unit 51 refers the comparison result supplied from the user terminal 21 only when the refund requesting party is a buyer of the subject software. The refund processing unit 51 then determines whether the contentss are equal in size to each other before and after the installation. If the size of the contents before the installation is not equal to the one after the installation, the refund processing unit 51 determines that the installation is terminated abnormally. Accordingly, the refund processing unit 51 permits to refund the money to the user. On the other hand, if the size of the contents before the installation is equal to the one after the installation, the refund processing unit 51 determines that the installation is terminated normally. The refund processing unit 51 thus does not permit to refund the money. The refund processing unit 51 then determines that the requesting user is dishonest in that he or she is insisting of failure of the installation in spite that the fact is that the installation is terminated normally. The refund processing unit registers the access number of the requesting user in the fraud user file 46c.

Other components are similar to those described in conjunction with the first embodiment, of which detailed description is omitted.

FIG. 14 is a flow chart illustrating operation carried out by the user terminal 21 in response to the reception of the buying number supplied from the center 22.

In response to the reception of the buying number through the modem 32 (step 1501), the user terminal 21 activates the content deciphering key generation unit 35. The content deciphering key generation unit 35 reads the machine ID of the device where it locates, out of the machine ID file 25a in the ROM 25 (step 1502). The content deciphering key generation unit 35 then notifies the content deciphering unit 36 of the generated deciphering key.

The content deciphering unit 36 reads the contents of the CD-ROM through the driver device 31 to decipher the contents with the deciphering key (step 1503). The content deciphering unit 36 then separates the deciphered contents into the header and the contents body to send the header and the contents body to the navigator 38 and the installer 37, respectively. The installer 37 installs the deciphered contents body into the hard disk device (HDD) of the user terminal 21 (step 1504). After completion of the installation, the check code calculation unit 38d in the navigator 38 detects the check code (data indicative of the sizes of the blocks) from each block of the contents installed (step 1505). The check code calculation unit 38d then calculates sum of the detected check codes (step 1506) to obtain the size of the contents body after the installation. Furthermore, the check code calculation unit 38d notifies the code data comparison unit 38e of the size of the contents body calculated.

The code data comparison unit 38e reads the size of the contents out of the header supplied from the content deciphering unit 36 to compare it with the size of the contents after the installation notified by the check code calculation unit 38d (step 1507). If the size before the installation is equal to the one after the installation, the code data comparison unit 38e determines that the installation is terminated normally. On the other hand, if the sizes are different from each other, the check code comparison unit 38e determines that the installation is terminated abnormally and displays the result on a screen of the CRT 29 (step 1508). In addition, the code data comparison unit 38e registers the comparison result along with the contents ID into the RAM 26 (step 1508).

Figure 16:
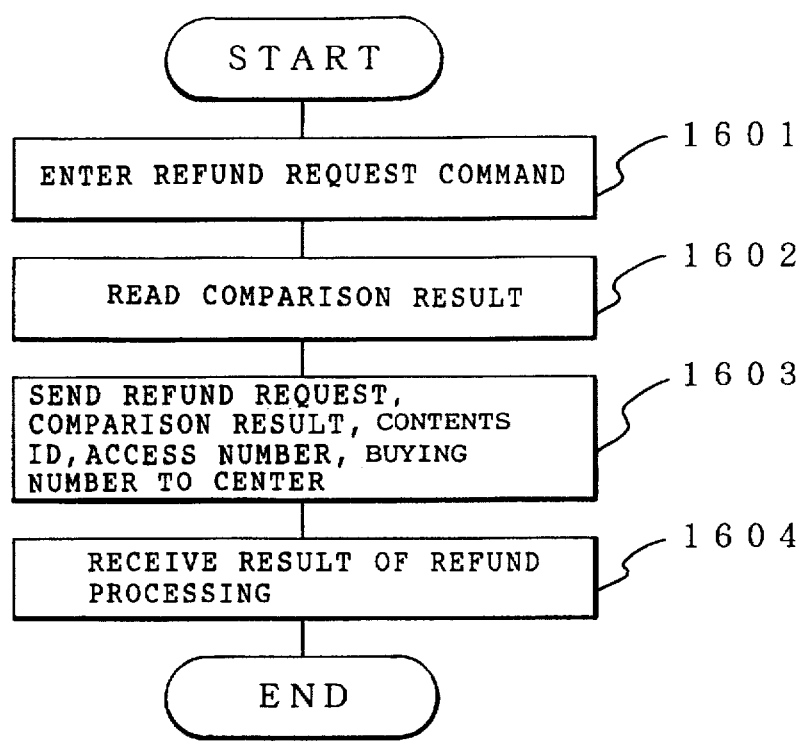
FIG. 16 is a flow chart illustrating operation carried out by the user terminal to issue a refund request.

FIG. 16 is a flow chart illustrating operation carried out by the user terminal 21 when the user enters the refund request command.

When the user enters the refund request command and the contents ID through the keyboard 27 or the mouse 28 (step 1601), the refund request unit 38b in the navigator 38 is activated. The refund request unit 38b reads the comparison result corresponding to the contents ID out of the RAM 26 (step 1602), to send the refund request for the software, the comparison result, the contents ID, the access number, and the buying number to the center 22 through the modem 32 (step 1603).

The center 22 executes or does not executes the refund processing depending on the results of the user identification and the of the certification on the comparison result. The center 22 sends an instruction indicative of the execution or non-execution of the refund processing to the user terminal 21. In response to the reception of the processing result (step 1604), the user terminal 21 displays it on the screen of the CRT 29.

Figure 17:
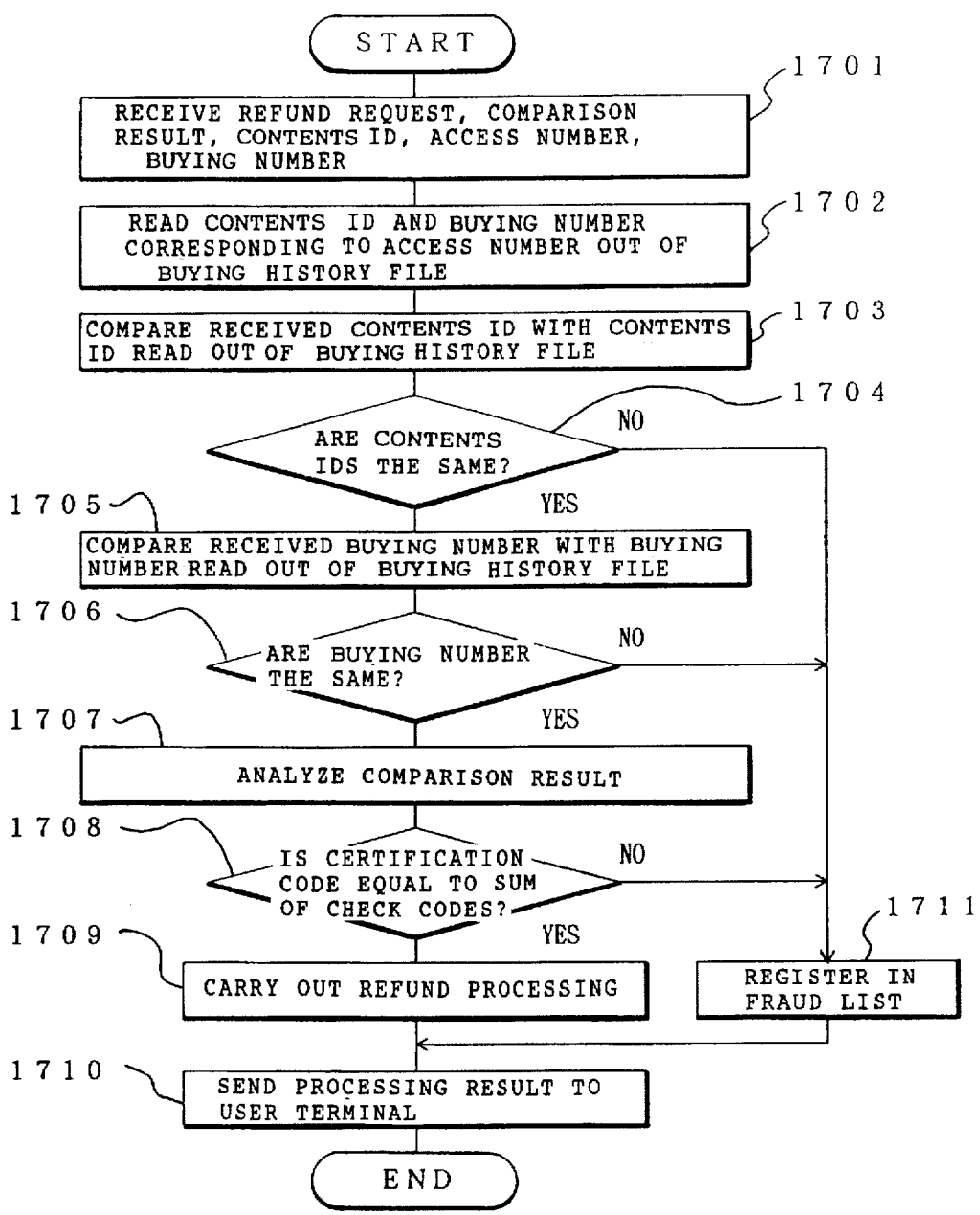
FIG. 17 is a flow chart illustrating operation carried out by the center in response to the refund request supplied from the user terminal.

Next, operation of the center 22 upon reception of the refund request is described with reference to FIG. 17.

In response to the reception of the comparison result, the contents ID, the access number, and the buying number along with the refund request supplied from the user terminal 21 through the modem 47 (step 1701), the identity determination unit 50 is activated. The identity determination unit 50 searches for the buying history file 46b in the hard disk device (HDD) 46 to read the contents ID and the buying number corresponding to the access number (step 1702). The identity determination unit 50 then compares the contents ID received from the user terminal 21 with the contents ID read out of the buying history file 46b (step 1703). If these contents IDs are the same (step 1704), the identity determination unit 50 compares the buying number received from the user terminal 21 with the buying number read out of the buying history file 46b (step 1705). If these buying numbers coincide with each other (step 1706), the identity determination unit 50 determines that the requesting user is a genuine user who actually bought the software. Accordingly, the identity determination unit 50 activates the refund processing unit 51.

The refund processing unit 51 analyzes the comparison result received from the user terminal (step 1707) to determine whether the value of the certification code is equal to the sum of the check codes (step 1708). If the value of the certification code is different from the sum of the check codes, the refund processing unit 51 determines that the installation is terminated abnormally. The refund processing unit 51 thus carries out the refund processing (step 1709).

If the contents IDs are different from each other at the step 1704, or if the buying numbers are different from each other at the step 1706, the identity determination unit 50 determines that the requesting user dishonestly request to refund the money for the software. The identity determination unit 50 thus registers the access number for that user in the fraud user list 46c in the hard disk device (HDD) 46 (step 1711).

If the value of the certification code is equal to the sum of the check codes at the step 1708, the refund processing unit 51 determines that the requesting user dishonestly request to refund the money in spite that the installation is terminated normally. The refund processing unit 51 thus registers the access number for the user in the fraud user list 46c in the hard disk device (HDD) 46 (step 1711).

As mentioned above, the second embodiment of the present invention also provides similar effects to those described in conjunction with the first embodiment. In the second embodiment, the comparison result may be enciphered before being supplied to the center 22. While the second embodiment has thus been described in conjunction with the case where the check data is the one indicative of the size of the contents, a certification code may equally be used that is obtained when the contents is compressed by using a hashing function used for digital signature. Any other data may be used as long as the effects of the present invention can be obtained.

The user terminal may refund the money without any further processing if the code data are different.

What is claimed is:

1. A system for refunding payment for software used for software distribution system comprising at least one user terminal and a center, the center notifying the user terminal of deciphering information on condition that a user of the user terminal pays for the software which is supplied to the user in a enciphered form, the user terminal deciphering the enciphered software by using the deciphering information, wherein the user terminal comprises:

deciphering means for deciphering a software by using deciphering information supplied from the center;

installation history recording means for recording an installation history for the software deciphered by said deciphering means; and refund request means for supplying a request for refunding payment for the software along with the installation history to the center; and wherein the center comprises:

refund processing means for determining whether the payment for the software should be refunded to the user by analyzing the installation history.

2. A system for refunding payment for software as claimed in claim 1, wherein the user terminal further comprises installation state monitoring means for monitoring a state of installing operation of the software deciphered by said deciphering means, said installation history recording means recording an installation start information when said installation state monitoring means detects that installing operation of the software is started.

3. A system for refunding payment for software as claimed in claim 1, wherein the user terminal further comprising installation state monitoring means for monitoring progress of installing operation or normall accomplishment of the installing operation of the software deciphered by said deciphering means.

said installation history recording means recording an installation progress information and/or an installation accomplishment information when said installation state monitoring means detects that the software is under installing operation or that the installing operation is accomplished normally.

4. A system for refunding payment for software as claimed in claim 1, wherein the center further comprises:

buying history registration means for registering buying history including a software identification data identifying the software and a deciphering information for each user identification data identifying a user; and identity determination means for determining whether the user is genuine buyer or not by referring said buying history registration means in accordance with the software identification data and the deciphering information for the software in response to the reception of the refund request from the user terminal.

5. A system for refunding payment for software as claimed in claim 1, wherein said installation history recording means registers, in the case that a plural of software are supplied to the user, installation histories for the respective software for each software identification data identifying the software.

6. A system for refunding payment for software as claimed in claim 1, wherein said refund request means enciferes the software identification data, the deciphering information, and the installation history, and notifies the center of them along with the refund request.

7. A system for refunding payment for software used for software distribution system comprising at least one user terminal and a center, the center notifying the user terminal of deciphering information on condition that a user of the user terminal pays for the software which is supplied to the user terminal in a enciphered form along with check code combined therewith, the user terminal deciphering the enciphered software by using the deciphering information, wherein the user terminal comprises:

wherein the user terminal comprises:

deciphering means for deciphering the software with the deciphering information;

installation means for installing the software deciphered by said deciphering means;

properness confirmation means for determining the properness of the check code by detecting the check code from the software installed by said installation means; and refund request means for notifying the center of the result of the determination made by said properness confirmation means, along with a refund request; and wherein the center comprises:

refund processing means for determining whether the payment for the software should be refunded by analyzing the result of determination notified from the user terminal.

8. A system for refunding payment for software as claimed in claim 7, wherein the check code is an attribute data of the software or various other identification data concerning the software.

9. A system for refunding payment for software as claimed in claim 7, wherein the software consists of a number of software units, said check code is a certification code obtained by means of compressing the software units or the entire software by using a hashing function.

10. A system for refunding payment for software as claimed in claim 7, wherein said software consists of a number of software units, said check code is indicative of the size of each software unit or of the size of the entire software.

11. A system for refunding payment for software as claimed in claim 7, wherein the center further comprises:

buying history registration means for registering buying history including software identification data and deciphering information for each user identification data identifying the user; and identity determination means for determining whether the user is a genuine buyer of the software by referring the buying history registration means in accordance with the software identification data and the deciphering information in response to the reception of the refund request from the user terminal.

* * * * *